F. RITCHIE.
ELECTRICAL RELAY.
APPLICATION FILED DEC. 16, 1905.
976,216.
Patented Nov. 22, 1910.
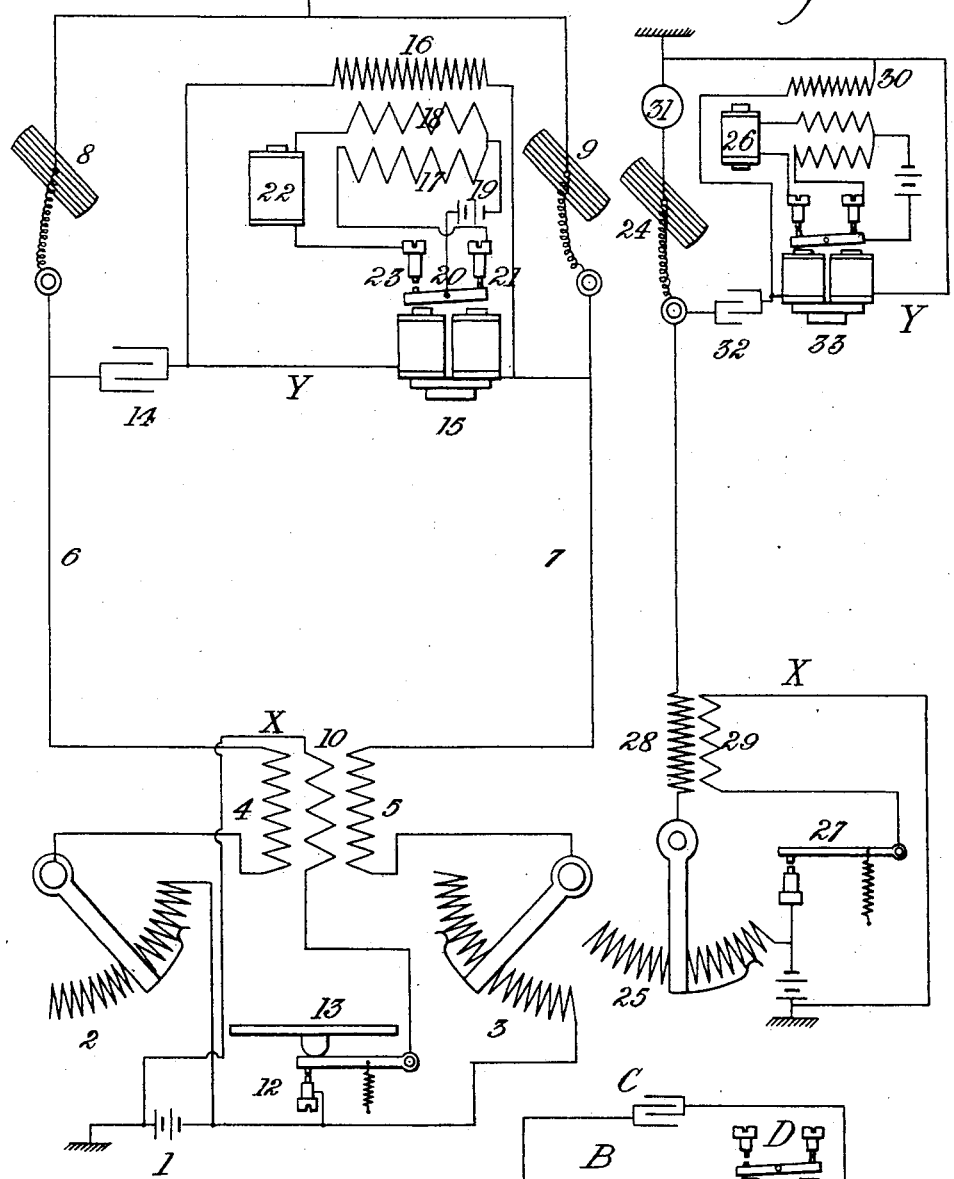

UNITED STATES PATENT OFFICE.

FOSTER RITCHIE, OF ACTON, ENGLAND.

ELECTRICAL RELAY.

976,216.  Specification of Letters Patent.  Patented Nov. 22, 1910.

Application filed December 16, 1905. Serial No. 291,985.

*To all whom it may concern:*

Be it known that I, FOSTER RITCHIE, a subject of the King of Great Britain, residing at 36 King Edward's Gardens, Acton, in the county of Middlesex, England, electrical engineer, have invented certain new and useful Improvements in Electrical Relays, of which the following is a specification.

This invention relates to electrical relays and consists in reinforcing the action of the relay by means of a local induced current whereby the relay may be operated by means of a line current otherwise too feeble for the purpose. For this purpose the primary of an induction coil is included in the local circuit, the secondary of the coil being connected across the terminals of the relay. These coils are so wound that when the relay contact of the local circuit is broken by means of the line current, the effect of the resulting induced current in the secondary is superimposed on that of the line current to complete the movement of the relay armature. Such an arrangement obviates the necessity of the delicate adjustment of relays which have to be operated by very feeble line currents, and in many cases enables translating devices to be brought into operation by such currents, which otherwise could not be operated without disturbing effects on the same or neighboring circuits.

The invention consists in the features of novelty which will be hereinafter described with reference to the accompanying drawings and more particularly pointed out in the claims.

In the said drawings, Figure 1 is a diagrammatic illustration of a relay and its various circuits, which is operated by transient currents or impulses and which contains a condenser in its circuit. Fig. 2 is a diagrammatic illustration of this invention as applied to a telautograph, and Fig. 3 is a diagrammatic illustration of the invention as applied to simultaneous transmission along a single line of Morse and alphabetical or printing telegraph signals.

In order that the object of the invention may be more readily appreciated the action of a condenser in the circuit of a relay which is operated by an induced impulse will be described with reference to Fig. 1 in which A is the primary winding of an induction coil having a battery and key in its circuit and B is the secondary winding of the coil which is included in a circuit containing a condenser C and polarized relay D. On establishing a current in the primary circuit by closing the key, a transient current is induced in the secondary circuit which moves the relay armature off one of the local circuit contacts, and also charges the condenser C. Upon the cessation of the transient current or impulse the condenser immediately discharges, producing a reverse current in the relay circuit which moves the armature back again. To obviate the effect of the reverse current and obtain a complete movement of the armature, delicate adjustment of the relay and a considerable strength of impulse are required. The method by which these defects are obviated by the present invention is illustrated in Fig. 2, with reference to its application to the pen lifting device of a telautograph and in Fig. 3 with reference to its application to simultaneous alphabetical and Morse telegraph transmission along one wire.

Referring to Fig. 2, in telautograph circuits it has been usual hitherto to operate the pen lifting device at the receiving station by vibratory currents transmitted from the sending station and such vibratory currents cause or may cause serious disturbance in neighboring circuits, whereas by the present invention it is possible to operate the pen-lifter by a single feeble impulse from the sending station. Currents flow from the battery 1 at the sending station X through rheostats 2, 3, the reversely wound induction coil windings 4, 5, lines 6, 7 and swinging coils 8, 9 to earth. The induction coil at X has its primary winding 10 connected with the battery 1 and contact points 12, the latter being controlled by the pressure of the writing style upon the platen 13. At the receiving station Y the line wires 6, 7 are connected through a condenser 14 and polarized relay 15. The relay is shunted by the secondary winding 16 of an induction coil which has two oppositely wound primary windings 17, 18 both connected at one end through a local battery 19 to the armature 20 of the relay the other end of winding 17 being connected with one relay contact 21 while the other end of coil 18 is connected through the pen lifter magnet 22 with the other relay contact 23. When the platen 13 is depressed a current is established in the primary winding 10 of the induction coil at X and impulses are thereby induced which traverse the line circuits 6, 7 and also the shunt circuit of the condenser 14 and relay circuit, whereby the relay armature is moved out of contact with 21. The local current in the primary winding 17 is consequently annulled and the resulting momentary impulse in the secondary winding 16 being stronger than the reverse impulse due to the discharge of the condenser 14 through the relay enables the relay armature to complete its movement and establish a local current in the other primary winding 18 of the induction coil, thereby causing another impulse to be sent from the secondary coil through the relay in the same direction as the first impulse. It will be apparent that the impulse received over the line need only be sufficient to lift the relay armature off the contact stop, the movement being completed by the comparatively strong impulses induced in the secondary circuit of the local induction coil.
The invention may be applied to other purposes as for example, to simultaneous alphabetical and Morse telegraph transmission along a single wire, or to a printing telegraph in which the movement of a rheostat arm at the sending station may actuate a printing wheel at the receiving station, the actual printing being effected by means of a relay such as above described, actuated by an impulse sent along the same line circuit from the sending end, for example by closing the primary of a transformer or induction coil, the secondary of which is included in the line circuit.

Fig. 3 illustrates the arrangement of apparatus for both of these applications of the invention. The alphabetical receiver or the printing wheel is represented by the pivoted member 24 the movement of which is controlled by the rheostat 25, while the coil 26 represents the electromagnet which effects the printing in one case, or the sounder or Morse writer magnet in the other case, its movements corresponding with those of the relay 33 the armature of which is as above described lifted off its contact by a feeble impulse induced in the secondary winding 28 of the transmitting transformer by the establishment or annulment of a current in the primary winding 29, the remainder of the movement being effected by impulses induced in the secondary 30 of the local circuit transformer. If necessary, an additional inductance 31 is included in the line circuit on the farther side of the shunt circuit which includes the condenser 32 and relay 33 so as to preclude the diversion of the feeble impulse which is sent along the line to energize the relay magnet.

Having thus described the nature of this invention and the best means I know of carrying the same into practical effect, I claim:—

1. The method of setting up and reinforcing the line impulse in relays which are operated by transient currents or impulses, which method consists in setting up an impulse in the relay to cause an initial movement in the armature of said relay, and immediately thereafter setting up an induced impulse in the circuit including said relay and in the same direction as the first said impulse.

2. The method of setting up and reinforcing the line impulse in relays which are operated by transient currents or impulses, which method consists in setting up an impulse in the relay to cause an initial movement of the armature of said relay, and immediately thereafter causing said armature to close a primary circuit to induce a second impulse in said relay circuit in the same direction as the first said impulse.

3. The method of setting up and reinforcing the line impulse in relays which are operated by transient currents or impulses, and which are connected up in circuit with a condenser, which method consists in setting up an impulse in the relay which causes an initial movement of the armature of said relay and the charging of said condenser, in closing a primary circuit by said armature for inducing a secondary impulse in the same direction to overcome the effects of the condenser discharge, and immediately thereafter causing a third induced impulse in the same direction as said initial and secondary impulses.

4. The method of setting up and reinforcing the line impulse in relays which are operated by transient currents or impulses, which method consists in setting up an impulse in the relay to cause an initial movement of the armature of said relay, and in successively closing a circuit through each of two different primary coils by the movement of said armature, thereby inducing successively two secondary impulses in the relay circuit in the same direction as the first impulse.

5. The method of reinforcing the line impulse in relays which are operated by transient currents or impulses, which consists in producing a primary impulse immediately after the initial impulse in the line and inducing by said primary impulse a secondary impulse in the relay circuit and in the same direction as the initial impulse.

6. The method of reinforcing the line impulse in relays which are operated by transient currents or impulses in circuits containing condensers to the discharge influence of which the relays are subjected, which consists in inducing an electrical impulse in the relay circuit through the condenser and at the time of the discharge of the condenser, in inducing an electrical impulse greater than and in opposition to the impulse due to such discharge.

7. The method of reinforcing the line impulse in relays which are operated by transient currents or impulses, which consists in producing in one circuit a secondary impulse, utilizing said secondary impulse to cause a primary impulse to flow in another circuit, and inducing a third impulse by said primary impulse, and superimposing the third impulse upon the first impulse and in the same direction.

In testimony whereof I have signed my name to this specification in the presence of two subscribing witnesses.

FOSTER RITCHIE.

Witnesses:
  JOSEPH MILLARD,
  WALTER J. SKERTEN.